(12) United States Patent
Burke, Jr. et al.

(10) Patent No.: US 8,780,369 B2
(45) Date of Patent: Jul. 15, 2014

(54) METHOD AND APPARATUS FOR MANAGING COMMON COLOR PROFILES FOR ONE OR MORE PRINTING DEVICES BY A CLOUD ADMINISTRATION SYSTEM

(75) Inventors: Robert William Burke, Jr., Stanley, NY (US); Michael Philip Kirby, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 55 days.

(21) Appl. No.: 13/529,701

(22) Filed: Jun. 21, 2012

(65) Prior Publication Data
US 2013/0342857 A1    Dec. 26, 2013

(51) Int. Cl.
*H04N 1/40*    (2006.01)
(52) U.S. Cl.
USPC ............................ 358/1.13; 358/504; 358/468
(58) Field of Classification Search
USPC ........ 358/1.9, 2.1, 1.13, 1.15–1.16, 500, 504, 358/400, 406, 468, 515, 518
See application file for complete search history.

(56) References Cited

U.S. PATENT DOCUMENTS

| | | | |
|---|---|---|---|
| 5,323,249 A * | 6/1994 | Liang | 358/518 |
| 7,245,395 B2 * | 7/2007 | Couwenhoven et al. | 358/1.9 |
| 8,077,352 B2 | 12/2011 | Bernal et al. | |
| 8,120,812 B2 * | 2/2012 | Sharma et al. | 358/1.9 |
| 8,373,894 B2 * | 2/2013 | Robinson | 358/1.9 |

OTHER PUBLICATIONS

Burke et al.; U.S. Appl. No. 13/357,368, filed Jan. 24, 2012; "Systems and Methods for Managing Customer Replaceable Unit Monitor (CRUM) Paired Identifiers Using a Cloud Administration System".
Robert W. Burke Jr.; U.S. Appl. No. 13/398,570, filed Feb. 16, 2012; "Methods and Systems for Managing Print Device Supplies Using Cloud Administration System Configured for Chemical Signature Tracking".

* cited by examiner

*Primary Examiner* — Thomas D Lee
*Assistant Examiner* — Stephen M Brinich
(74) *Attorney, Agent, or Firm* — Ronald E. Prass, Jr.; Prass LLP

(57) ABSTRACT

An approach is provided for cloud administrative management of spatial uniformity correction useful in printing. The approach involves determining, by a cloud administration system, an achievable gamut achievable by an imaging system for at least one of: all spatial locations of an output image, all print engines of a plurality of print engines, and at least one printer within a cluster of printers. The approach also involves determining, a mean gamut. The approach further involves causing, at least in part, a gamut mapping from the mean gamut to the achievable gamut. The approach additionally involves determining a set of transformations for each of a set of input colors to a set of target colors, the set of target colors selected from colors in the achievable gamut. The approach further involves causing, at least in part, an output image to be generated based, at least in part, on the transformed values.

18 Claims, 6 Drawing Sheets

METHOD AND APPARATUS FOR MANAGING COMMON COLOR PROFILES FOR ONE OR MORE PRINTING DEVICES BY A CLOUD ADMINISTRATION SYSTEM

RELATED APPLICATIONS

This application is related to the U.S. patent application Ser. No. 13/112,625 entitled "Methods and Systems for Managing Print Device Licenses Using a Cloud Administration System," U.S. patent application Ser. No. 13/112,245 entitled "Method and System for Managing Print Jobs Using a Cloud Administration System," U.S. patent application Ser. No. 13/112,303 entitled "Method and System for Managing Print Device Information Using a Cloud Administration System," U.S. patent application Ser. No. 13/112,396 entitled "Methods and Systems for Providing Software Updates Using a Cloud Administration System," U.S. patent application Ser. No. 13/112,455 entitled "Methods and Systems for Tracking and Managing Print Device Inventory Information Using a Cloud Administration System," and U.S. patent application Ser. No. 13/112,552 entitled "Method and System for Managing Print Device Information Using a Cloud Administration System," each filed on May 20, 2011, the entire disclosures of each application being incorporated by reference herein in their entirety. This application is also related to the U.S. patent application Ser. No. 13/357,368 entitled "Systems and Methods for Managing Customer Replaceable Monitor (CRUM) Paired Identifiers Using a Cloud Administration System," filed Jan. 24, 2012, and U.S. Pat. No. 8,077,352 filed Jan. 26, 2009 the entire disclosures of which are incorporated herein by reference in their entirety.

FIELD OF DISCLOSURE

This disclosure relates to an apparatus, method and system for managing common color profiles for one or more printing devices by a cloud administration system.

BACKGROUND

Service providers and device manufacturers are continually challenged to deliver value and convenience to consumers by, for example, providing compelling print management administrative services. Image non-uniformity has long been a difficult problem for most digital marking processes. Such non-uniformity can occur across an image printed by a single printing device, or may be prevalent among images printed by any or all printing devices among a group of printing devices. Image non-uniformity can take many forms such as, for example, streaks, bands, and/or variations in gray level in the printed image. It is to be appreciated, however, that the defects discussed are only exemplary, and embodiments described herein are not limited to defects running parallel to a process direction.

Conventional spatial uniformity correction via spatially varying tone reproduction curves (sTRCs) and spatially varying multi-dimensional lookup tables (sDLUTs) has been demonstrated to be effective in compensating for monochromatic and process-color streaks, and in compensating for side-to-side non-uniformity. These methods generally map a set of spatially varying engine response curves across a page to a mean engine response to attain a spatially uniform overall printer response.

However, conventional spatial non-uniformity correction techniques often fail to achieve a mean density for all positions on the page for densities close to the maximum density ($D_{max}$). A similar problem exists for process-color streaks and sDLUTs. That is to say, the spatial mean color gamut may be unattainable by some of the local engine responses, thus rendering the compensation ineffective for particular colors on certain portions of the page. In other words, if a spatial mean color gamut is determined, all printing systems among a group of printing systems may not be able to achieve all of the colors within the spatial mean color gamut. As such, conventional spatial uniformity correction techniques may only compensate for non-uniform image defects for a one or more printers locally, but fail to correct spatial non-uniformity among all printing systems in a group.

Conventional sDLUT implementations for streak compensation map the local engine response to the spatially averaged engine response. This method suffers from a limitation in its ability to compensate for streaks because the color gamut defined by this mean engine response may be unattainable at portions of the page where the local engine response curves have smaller color gamuts, for example. Accordingly, streak compensation will not be effective for out-of-gamut colors at those regions.

SUMMARY

Therefore, there is a need for an approach for managing common color profiles for one or more printing devices by a cloud administration system.

According to one embodiment, a method for cloud administrative management of spatial uniformity correction useful in printing, the method comprises determining, by a cloud administration system, an achievable gamut achievable by an imaging system for at least one of: all spatial locations of an output image, all print engines of a plurality of print engines, and at least one printer within a cluster of printers, wherein the cloud administration system is a remote resource from at least one of the plurality of print engines and the cluster of printers. The method also comprises determining, by the cloud administration system, a mean gamut, wherein the mean gamut is any gamut containing the achievable gamut. The method further comprises causing, at least in part, a gamut mapping from the mean gamut to the achievable gamut. The method additionally comprises determining a set of transformations for each of a set of input colors to a set of target colors, the set of target colors selected from colors in the achievable gamut. The method also comprises causing, at least in part, for a received digital image, a transformation of values of at least one of each received image pixel and clusters of received image pixels to transformed values based, at least in part, on the determined set of transformations. The method further comprises causing, at least in part, an output image to be generated based, at least in part, on the transformed values.

According to another embodiment, an apparatus for cloud administrative management of spatial uniformity correction useful in printing comprises at least one processor, and at least one memory including computer program code for one or more computer programs, the at least one memory and the computer program code configured to, with the at least one processor, cause, at least in part, the apparatus to determine, at a cloud administration system, an achievable gamut achievable by an imaging system for at least one of: all spatial locations of an output image, all print engines of a plurality of print engines, and at least one printer within a cluster of printers, wherein the cloud administration system is a remote resource from at least one of the plurality of print engines and the cluster of printers. The apparatus is also caused to determine, at the cloud administration system, a mean gamut, wherein the mean gamut is any gamut containing the achievable gamut. The apparatus is further caused to cause, at least in part, a gamut mapping from the mean gamut to the achievable gamut. The apparatus is additionally caused to determine a set of transformations for each of a set of input colors to a set of target colors, the set of target colors selected from colors in the achievable gamut. The apparatus is also caused to cause, at least in part, for a received digital image, a transformation of values of at least one of each received image pixel and clusters of received image pixels to transformed values based, at least in part, on the determined set of transformations. The apparatus is further caused to cause, at least in part, an output image to be generated based, at least in part, on the transformed values.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments of the invention are illustrated by way of example, and not by way of limitation, in the figures of the accompanying drawings.

DETAILED DESCRIPTION

Figure 1A:
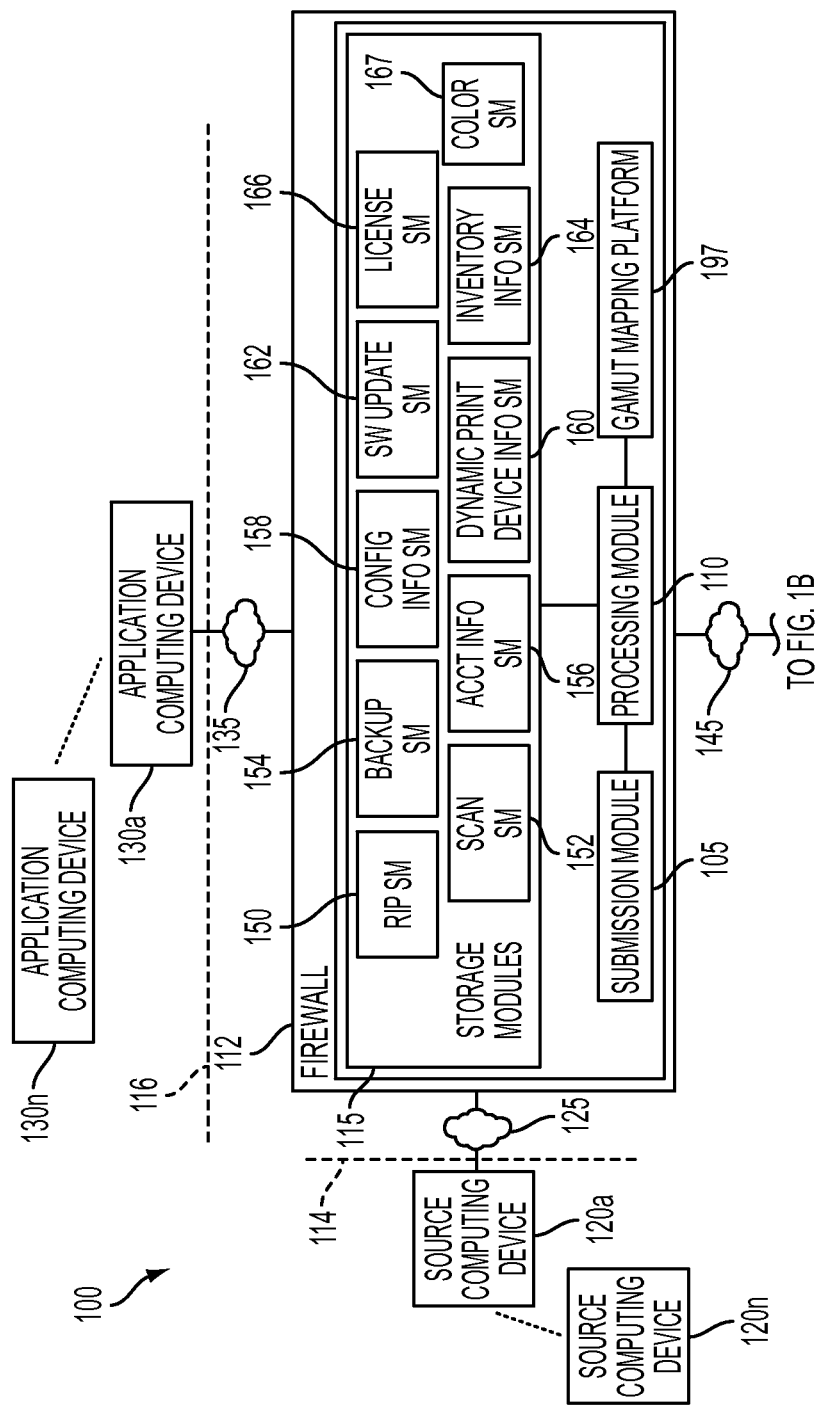
FIG. 1A is a portion of diagram of a system capable of managing common color profiles for one or more printing devices by a cloud administration system, according to one embodiment.

Examples of a method, apparatus, and computer program for managing common color profiles for one or more printing devices by a cloud administration system are disclosed. In the following description, for the purposes of explanation, numerous specific details are set forth in order to provide a thorough understanding of the embodiments of the invention. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

As used herein, the following terms shall have, for the purposes of this application, the respective meanings set forth below.

An "application computing device" is a computing device capable of sending information to or receiving information from a cloud administration system.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. Exemplary computing devices may include personal computers, servers, mobile communication devices and/or the like, as discussed in more detail below.

A "color imaging medium" refers to a medium for capturing or displaying color information (e.g., scanners, digital cameras, displays, prints, projections).

A "firewall" is hardware and/or software used to protect a resource of a network from unauthorized external access.

A "gamut" refers to an achievable range of colors that are capable of being printed by a print device.

A "gamut mapping" refers to a method for assigning colors from a reproduction medium to colors from an original medium.

An "image" refers to two-dimensional visual stimulus, including visual stimuli that appear to be three-dimensional.

A "job" refers to a logical unit of work that is to be completed for a customer.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or "print-related function" is a function that is performed on a print job during production. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a printing device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "queue" is a data structure stored on a computer-readable medium and configured to temporarily store information, including, but not limited to a print job, a print device license and/or the like.

The term "remote," as used herein with respect to computing devices and/or printing devices, refers to devices that operate on different computer networks and/or computer networks operated by different entities. For example, a computing device is remote from a printing device if the computing device is connected to a first LAN operated by a first entity and the printing device is connected to a second LAN operated by a second entity.

A "resource" is a physical device comprising a processor and/or a storage medium. Exemplary resources may include a computing device, a processing device, a storage device and/or or the like.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

A "Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

Figure 1B:
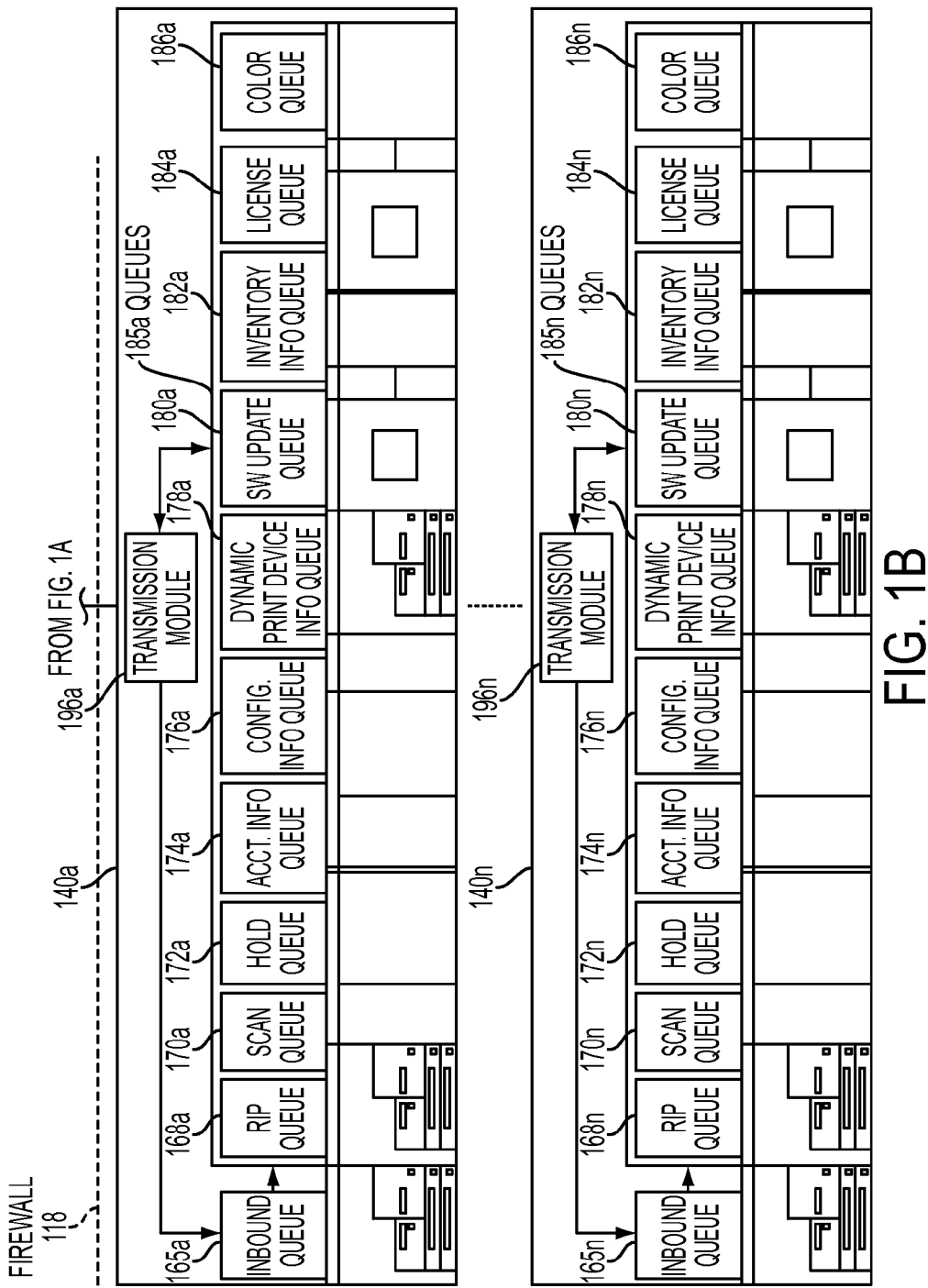
FIG. 1B is a portion of diagram of a system capable of managing common color profiles for one or more printing devices by a cloud administration system, according to one embodiment.

FIGS. 1A and 1B together form a diagram of a system capable of managing common color profiles for one or more printing devices by a cloud administration system, according to one embodiment.

Color and monochromatic images are presently reproduced on a variety of imaging media such as, e.g., computer and television displays, print, projection screens, etc. Furthermore, the reproduced images may have been acquired from a variety of sources such as, e.g., digital cameras, conventional photographs, or original artwork in either analog or digital form. To complicate matters, each reproduction device has limitations with respect to the range of colors which it can reproduce, i.e., its color gamut. In other words, the color gamut of a device is the range of colors attainable by that device. Since each device can, and often does, have a different achievable range (gamut) of colors, it is frequently the case that some colors cannot be made to match the original source exactly. As a result of such gamut mismatches, it becomes necessary to assign the original colors to colors that a given output device is capable of reproducing. This process is often referred to as gamut mapping, and refers to a method for assigning colors from the reproduction medium to colors from the original medium.

Associated with this is the concept of digital image data, which are two-dimensional arrays of value multiplets containing information about an image. In other words, while an image is something that is by definition visible, digital image data are not. As discussed above, the phrase color imaging medium refers to a medium for capturing or displaying color information (e.g., scanners, digital cameras, displays, prints, projections). Thus, color imaging devices are devices that bring about color reproduction media and can either be identical to them (e.g., a display is both a device and a medium) or different from them (e.g., a printer is a device that is used for obtaining a print—the medium).

A color gamut is the range of a set of colors. Because gamuts can be represented as locations in a three-dimensional color space, a color gamut can be represented as a volume in such a space. Given that a gamut is a volume and that this volume is finite, it also has a surface, and this is referred to as the gamut boundary. Examples of sets of colors whose gamuts are of interest are the colors in an image or the colors that are reproducible within a given medium.

However, the color gamut is spatially dependent for printers with spatial non-uniformity of monochromatic and/or process colors, for which reason there is, instead of a single color gamut, a set of spatially dependent gamuts. This means that a printing device may not be able to print uniformly over an area of a sheet, or a group of printers may not be able to print uniform images on all sheets processed among a group of printers. For example, intermediate belt transfer (IBT) print engines suffer from side-to-side process-color non-uniformity that is not present in the monochrome separations. From the set of spatially dependent gamuts, one can define several concepts. For example, the union of all spatially dependent gamuts is referred to herein as the maximum gamut; the gamut defined by the colors obtained with the average engine response curve in the monochromatic case, or multi-dimensional set of points in the process-color case, is referred to herein as the mean gamut; and the intersection of all spatially dependent gamuts is referred to herein as the minimum or intersection gamut. Of these types of gamuts, only the minimum gamut is attainable at every position of the page.

It is desirable for spatial uniformity correction via spatially varying tone reproduction curves (TRCs) and multi-dimensional lookup tables (DLUTs) to map local engine response functions to spatially averaged engine response functions, and to allow other color management operations to vary the average function according to needs other than uniformity such as, e.g., drift, gray balance, user preference, etc. A problem with this approach, however, when applied to DLUTs, is that the gamut defined by average engine response functions may not be attainable at every location of the page for one or more print devices.

For example, if a mean engine response (mean gamut) is represented as a distorted cube having an exemplary volume of 47.4 k $\Delta E^3$. An intersection gamut may be represented as a cube having an exemplary volume of 40 k $\Delta E^3$. The intersection gamut in this example is the intersection of the set of spatially varying gamuts of a color printer operating under conditions known to produce high amplitude streaks. The corners of the example distorted cubes correspond to the colors white, black, cyan, magenta, yellow, red, green, and blue. The mean gamut, therefore, includes colors not attainable in the intersection gamut (i.e. because the mean gamut volume is greater than the intersection gamut volume). Accordingly, some intended colors (in the mean gamut) are not attainable at certain portions of the page if printed by the printing device.

Image non-uniformity by failing to print some intended colors (in the mean gamut) at certain portions of the page has long been a difficult problem for most digital marking processes. Such non-uniformity can occur across an image printed by a single printing device, or may be prevalent among images printed by any or all printing devices among a group of printing devices. Image non-uniformity can take many forms such as, for example, streaks, bands, and/or variations in gray level.

Streaks are one-dimensional image defects that generally run parallel to the process direction in a printed image. Streaks are typically caused by the undesirable non-uniform response of some components in a marking engine. Defects in the subsystems of a xerographic printer, an inkjet printer, or similar image forming system may give rise to visible streaks in a printed image. For example, photoreceptor scratches, contamination of the charger wire, non-uniform LED imager and Raster Output Scanner (ROS) spot size variations are examples of subsystem problems giving rise to rendered image streaking in a xerographic marking engine. Bands are also one-dimensional image defects that generally run perpendicular to the process direction in a printed image. Bands are typically caused by time-varying performance of a marking subsystem such as non-uniform velocity of the photoreceptor drive, out-of-roundness of development rolls, and wobble of the ROS polygon mirror. In a uniform patch of gray, streaks and bands may appear as a variation in the gray level. In general, "gray" refers to the optical density or area coverage value of any single color separation layer, whether the toner is black, cyan, magenta, yellow or some other color.

In some situations, streaks may run parallel to a process direction, and the magnitude of the streaking or the difference in toner intensity is a function of cross-process position, for example. It is to be appreciated, however, that the defects discussed are only exemplary, and embodiments described herein are not limited to defects running parallel to a process direction. In various exemplary embodiments described herein as systems and methods, streaks or improper toner density regions caused by spatial non-uniformity are compensated for prior to actual printing of the document.

Conventional spatial uniformity correction via spatially varying tone reproduction curves (sTRCs) and spatially varying multi-dimensional lookup tables (sDLUTs) has been demonstrated to be effective in compensating for monochromatic and process-color streaks, and in compensating for side-to-side non-uniformity. These methods generally map a set of spatially varying engine response curves across a page to a mean engine response to attain a spatially uniform overall printer response.

However, conventional spatial non-uniformity correction techniques often fail to achieve a mean density for all positions on the page for densities close to maximum density ($D_{max}$), and an "Achievable Aim TRC" method was developed to address this problem for monochromatic streaks as described in U.S. Patent Application Document No. 2006/0077488. However, it has been shown that a similar problem exists for process-color streaks and sDLUTs. That is to say, the spatial mean color gamut may be unattainable by some of the local engine responses, thus rendering the compensation ineffective for particular colors on certain portions of the page. In other words, if a spatial mean color gamut is determined, all printing systems among a group of printing systems may not be able to achieve all of the colors within the spatial mean color gamut. As such, conventional spatial uniformity correction techniques may only compensate for non-uniform image defects for a one or more printers locally, but fail to correct spatial non-uniformity among all printing systems in a group.

To address this problem, a cloud administration system 100 illustrated in FIG. 1 introduces the capability to manage common color profiles for one or more printing devices.

The cloud administration system 100 calculates an achievable gamut for at least one print device and causes at least one print device among a group of print devices to output one or more images using the achievable gamut that is commonly achievable by all of the print devices associated with the cloud administration system 100 that are designated as being part of the group of print devices. Accordingly, an image may be produced by any print device among the group of print devices that is uniform when compared the other print devices that are part of the designated group. For example, if a group comprises five print devices, and each print device is capable of printing a red image, but four of the five print devices can print three shades of red and the fifth print device can merely print two shades of red, the cloud administration system 100 causes all five of the printers in the group to print the image using only two shades of red such that the image is uniform among the entire group of print devices. Similarly, the could administration system causes non-uniform image correction for an imaging system that may or may not comprise a plurality of print devices for all spatial locations of an output image, all utilized print engines, or one printer within a cluster of printers, for example. The cloud administration system 100 manages the non-uniform image correction regardless of location, time, or capability of any particular print device that is part of an imaging system or group, for example.

As will be discussed in more detail below, the cloud administration system 100 transforms individual printer responses regarding respective achievable color gamuts into a common reference printer response, then performs a gamut mapping from the common response to a commonly achievable gamut for all of the print devices that are considered to be part of a group that will perform a particular print job. A two-step approach is used because traditional gamut mapping alone does not guarantee spatial uniformity, i.e., it only guarantees color achievability. The common achievable gamut that is employed herein is the intersection of spatial gamuts, and in some embodiments, an intersection of achievable gamuts determined for each individual print device that is part of a group of print devices to further hone in on a minimum achievable gamut that all print devices of the group are capable of printing.

In some embodiments, the cloud printing administration system manages designated associated groups of printers, defined by an administrator. Each group of printers generates individual printer responses regarding individual associated color gamuts. The cloud administration system 100 computes the intersection of the spatially dependent print engine responses to determine the minimum color gamut (intersection) that each individual print device in the spatially dependent (and cloud defined printer group) can print. That is, each print device is therefore capable to print every color within the intersected gamut in this embodiment. In one or more embodiments, the cloud administration system 100 generates a mean printer model (and mean gamut) by averaging L*a*b values corresponding to CMY(K) values of the targeted colors. A process run by the cloud administration system 100 maps the mean color gamut to the minimum (intersected) gamut and facilitates a transmission of the intersected gamut to any and/or all of the printer devices associated with the designated group managed by the cloud administration system 100. The print devices may automatically download and use the intersected gamut for the set of print devices in the group for which optimum color uniformity is desired (e.g. a customer's set of machines).

FIG. 1 illustrates an exemplary cloud administration system 100 according to an embodiment. As illustrated by FIG. 1, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In one or more embodiments, a storage module 115 may correspond to an operation or type of operation to be performed on a print job, or it may correspond to the type of information it stores. For example, as illustrated by FIG. 1, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166, a color storage module 167 and/or the like. Storage modules 115 are discussed in more detail below.

According to various embodiments, the cloud administration system 100 may be in communication with one or more source computing devices 120a-120n (collectively referred to as source computing device 120). The source computing device 120 may be located remotely from the cloud administration system 100. In an embodiment, all source computing devices 120 may be located remotely from the cloud administration system 100. In some embodiments, a source computing device 120 may communicate with the cloud administration system 100 through a plurality of firewalls. For example, a communication from a source computing device 120 to a submission module 105 may pass through a firewall 114 associated with the source computing device and the firewall 112 associated with the cloud administration system 100.

In one or more embodiments, the source computing device 120 may communicate directly with the cloud administration system 100 over a network 125. According to various embodiments, the network 125 may, for example, be operated by an entity. An entity may be a corporation, an organization, a group, an individual and/or the like. In embodiments, a plurality of source computing devices 120 may communicate with the cloud administration system 100 over one or more networks 125, for example.

In one example embodiment, the cloud administration system 100 may be in communication with one or more application computing devices 130a-130n (collectively referred to as application computing device 130). The application computing device 130 may be in communication with the processing module 110 and/or one or more storage modules 115. In an embodiment, the application computing device 130 may communicate with the cloud administration system 100 through a plurality of firewalls. For example, a communication from the application computing device 130 to the processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. Alternatively, an application computing device 130 may be a component of the cloud administration system 100.

The application computing device 130 may communicate with the cloud administration system 100 over a network 135. In an embodiment, an application computing device 130 may communicate directly with the submission module 105 over the network 135. In embodiments, the application computing device 130 may communicate with the submission module 105 through one or more firewalls.

An application computing device 130 may be located remotely from a source computing device 120. In an embodiment, each application computing device 130 may be located remotely from each source computing device 120. In various embodiments, the network 135 over which an application computing device 130 may communicate with a cloud administration system 100 may be operated by a different entity than that which operates a network over which a source computing device 120 may communicate with the cloud administration system.

According to various embodiments, the cloud administration system 100 may be in communication with one or more print devices 140a-140n (collectively referred to as print device 140). A print device 140 may be located remotely from the cloud administration system 100 and may communicate with the cloud administration system over one or more networks 145, for example. In an embodiment, each print device 140 may be located remotely from the cloud administration system 100.

In one or more embodiments, a print device 140 may communicate with the cloud administration system 100 through a plurality of firewalls. For example, a communication from a print device 140 to the cloud administration system 100 may pass through a firewall 118 associated with the print device 140 and the firewall 112 associated with the cloud administration system 100.

In an embodiment, a print device 140 may be located remotely from a source computing device 120 and an application computing device 130. In embodiments, each print device 140 may be located remotely from each source computing device 120 and each application computing device 130. In various embodiments, the network 145 over which a print device 140 may communicate with a cloud administration system 100 may be operated by an entity that is different than that which operates a network over which a source computing device 120 may communicate with the cloud administration system and/or a network over which an application computing device 130 may communicate with the cloud administration system.

In an embodiment, a print device 140 may have one or more queues 185a-185n (collectively referred to as queues 185) that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165a-165n (collectively referred to as inbound queue 165), such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1, a print device 140 may have a respective RIP queue 168a-168n (collectively referred to as RIP queue 168), a scan queue 170a-170n (collectively referred to as scan queue 170), a hold queue 172a-172n (collectively referred to as hold queue 172), an accounting information queue 174a-174n (collectively referred to as accounting information queue 174), a configuration information queue 176a-176n (collectively referred to as configuration information queue 176, a dynamic print device information queue 178a-178n (collectively referred to as dynamic print device information queue 178), a software update queue 180a-180n (collectively referred to as software update queue 180), an inventory information queue 182a-182n (collectively referred to as inventory information queue 182), a license queue 184a-184n (collectively referred to as license queue 184), a color queue 186a-186n (collectively referred to as color queue 186), and/or the like. Queues 185 are discussed in more detail below.

In an embodiment, a print device 140 may have a respective transmission module 196a-196n (collectively referred to as transmission module 196). A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may or may not communicate directly with one another. For example, as illustrated by FIG. 1, the source computing device 120, the application computing device 130 and the print device 140 may communicate indirectly via a cloud administration system 100.

In an embodiment, an achievable color gamut may be associated with only one print device 140. In an alternate embodiment, a common achievable color gamut may be associated with a plurality of print devices 140 that are among a designated group of print devices 140.

In an embodiment, an achievable color gamut may include information regarding a range of colors that a particular print device 140 may be capable of printing. In one or more embodiments, an achievable color gamut may be stored on the print device 140 in its respective color queue 186 to which it corresponds as well as in the color storage module 167 in the cloud administration system 100. If the cloud administration system 100 is configured to designate a group of print devices 140, the color storage modules 167 may also be configured to designate a logical printer group comprising individual color storage modules associated with each of the print devices 140 that are included in the designated printer group.

As discussed above, individual printer responses regarding achievable color gamuts may be submitted by one or more of the print devices 140 to the cloud administration system 100 which may process the individual printer responses by way of the processing module 110. In some embodiments, the processing module may comprise, or have connectivity to, a gamut mapping platform 197. The gamut mapping platform 197 determines an intersect of one or more individual printer responses and calculates a mean gamut associated with the individual printer responses. The gamut mapping platform 197 then performs a gamut mapping and transforms one or more local and target colors in the intersection gamut to produce a set of sDLUTs. The common set of sDLUTs would be stored in each individual printer's associated color storage module 167 and/or locally in the color queue 186.

In one or more embodiments, the cloud administration system 100 may monitor image quality of printed images that are output by one or more print devices 140 and compare the output images with the determined common achievable color gamut associated with the print device 104 or the designated group of print devices 140. If an allowable variance is described in the cloud administration system 100, a local or cloud based process measures an individual print device's 140 variance from the intersected gamut. A threshold may be preset as an allowable variance range, and if the threshold is reached, cloud administration system 100 may cause an error message to be generated. The error message may provide any number of options such as, but not limited to, continuing a print job if the print job is not color sensitive, continuing the print job if the job is color sensitive but close to the variance and near the end of the run, and stopping the print job if the job is color critical to correct the cause of the variance, such as maintenance.

In one or more embodiments, the cloud administration system 100 may store account profiles in the account information storage module 156, for example, to store and manage common gamuts and lookup tables for user account. The cloud-based management may enable a user to dynamically change the logical members of a printer group in response to individual printer variance, for example. Adding and removing print engines from a group would allow a user to better manage their print job outputs.

By way of example, the communication networks 125, 135, and 145 of cloud administration system 100 may be separately managed and segregated networks, or they may represent separate connections to a same network. The networks 125, 135, and 145 include one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The source computing device 120 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the source computing device 120 can support any type of interface to the user (such as "wearable" circuitry, etc.).

By way of example, the cloud administration system 100, source computing device 120, application computing device, 130, and print device 140 communicate with each other and other components of the communication networks 125, 135, and 145 using well known, new or still developing protocols. In this context, a protocol includes a set of rules defining how the network nodes within the communication network 125, 135, and 145 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
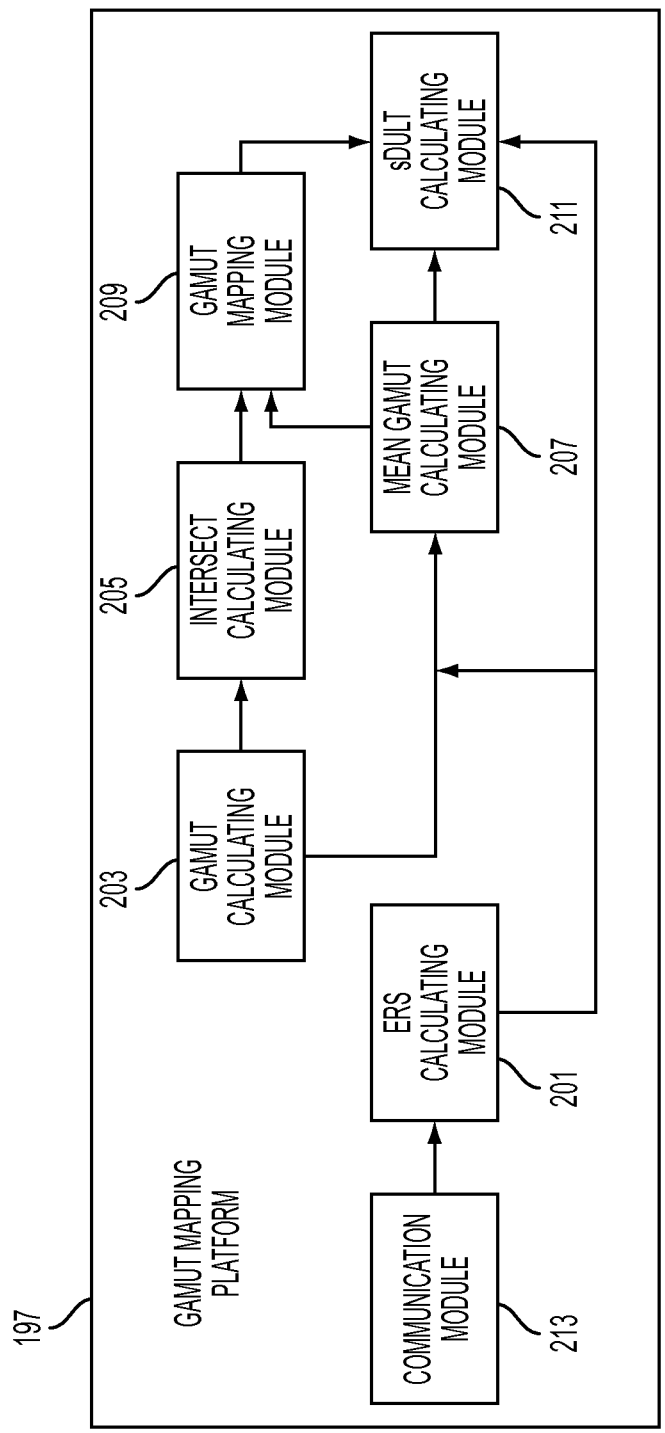
FIG. 2 is a diagram of the components of gamut mapping platform, according to one embodiment.

FIG. 2 is a diagram of the components of the gamut mapping platform 197, according to one embodiment. By way of example, the gamut mapping platform 197 includes one or more components for managing common color profiles for one or more printing devices by a cloud administration system. It is contemplated that the functions of these components may be combined in one or more components or performed by other components of equivalent functionality. In this embodiment, the gamut mapping platform 197 includes an ERS-calculating module 201, a gamut-calculating module 203, an intersection-calculating module 205, a mean ERS/gamut-calculating module 207, a gamut-mapping module 209, an sDLUT-calculating module 211, and a communication module 213.

According to various embodiments, the gamut mapping platform 197 may generate common achievable gamuts for as follows. Color profiles (e.g. Lab, XYZ, RGB, etc.) of strips from streak compensation calibration targets received by a communication module 213. For example, suitable strips can occupy the full width of a page and may be 0.5" to 1.5" in length per target color. Spatial color printer models (spatially dependent engine response sets, ERSs) are then generated by the ERS-calculating module 201 utilizing the information provided by the color profiles of the strips. In this context, the color printer models are a mapping from device dependent color space to device-independent color space, and referred to herein as engine response sets (ERSs). The print device 140 response sets may be for example ERS: CMY→L*a*b* and K→L*, or CMYK→L*a*b* mappings for each position of the page, i.e., each pixel column or set of pixel columns. More specifically, for example, if x is the spatial index, then $ERS_x$: $(CMYK)_x \rightarrow (Lab)_x$ for each CMYK value for which spatial profiles are available and for x=1, 2, . . . , N, where N is the number of spatial positions being considered. Each spatial location has three sets, e.g., one for L*, one for a*, and one for b*, or the set could be said to be triple valued.

The spatial resolution of the color printer model depends on the application. For example, for narrow streak compensation, there is usually one printer model per pixel column or possibly spanning a few pixel columns (where, e.g., 1 pixel column=1/600 in). For applications such as, e.g., compensation for side-to-side non-uniformity for IBT retransfer, a local printer model (local engine response) could span 300 pixel columns.

Each local color printer model (engine response) has associated with it a color gamut as determined by the gamut calculating module 203 where the set of spatially dependent color gamuts associated with the set of spatially dependent engine response sets are computed. From the set of spatially dependent color gamuts are determined by the gamut calculating module 203, a minimum (intersection) color gamut is calculated by the intersect calculating module 205. This set of spatially dependent color gamuts may, e.g., be a set of Lab values, denoted herein as $\cap_x(Lab)_x$. This color gamut is of particular interest since, in theory, every color within that color gamut can be achieved by the print device 140, or group of print devices, regardless of the position in the page. It is to be appreciated, however, that the present application is not limited to Lab values; other device-independent spaces, including perceptually uniform color spaces such as Luv, or spectral color spaces may be used.

A mean printer model (and its associated mean gamut) is determined by the mean gamut calculating module 207 by spatially averaging the Lab values corresponding to the CMY (K) values of the target colors. More specifically, the intermediate, unique reference ERS whose associated color gamut contains the intersection gamut (e.g. the spatially averaged or mean ERS) is computed. Any intermediate engine response known in the art that contains the intersection gamut can be used. However, in the present application, the gamut associated with the mean engine response is used for illustrative purposes. By definition, the intersection color gamut is contained in the color gamut defined by the mean engine response. Therefore, a mapping from the mean color gamut to the intersection color gamut can be calculated by the gamut mapping module 209 using any mapping technique known in the art, e.g., gamut clipping or gamut compression. The gamut mapping maps the color gamut associated with the intermediate reference engine response to the intersection (or minimum) color gamut. This defines a mapping denoted as $Lab \rightarrow Lab_{target} = \cap_x(Lab)$.

Gamut clipping offers a simple method in that its approach is to modify only those colors in an original image that are outside the reproduction gamut which, in the present application, is the intersection gamut. However, even the simpler gamut clipping approach offers several alternatives such as, e.g., minimum ΔE gamut clipping (mapping to the color that has the smallest color difference), and hue-preserving minimum ΔE gamut clipping. Gamut compression algorithms are generally more complex in that they are primarily focused on preserving variations and relationships between nearby colors, and they can potentially affect all of the original colors rather than only the out-of-gamut colors. A simple form of gamut compression known in the art applies a single rule for determining a line along which to map colors, and then compressing along that line. However, other gamut compression techniques are known in the art, including composite gamut mapping algorithms. Further, the present application is not limited to gamut clipping and gamut compression, and any gamut mapping algorithm known in the art may be used in embodiments described herein.

For each target color, the mapping resulting from the composition of the two mappings (the first one mapping to the mean gamut and the second one mapping to the intersection gamut) across the page, yields a uniform color that is attainable at all spatial locations. For non-target colors, interpolation techniques (e.g. tetrahedral or moving-matrix) can be used to infer the appropriate mapping from neighboring target colors.

Finally, from the mean-to-intersection gamut mapping, the mean color gamut, and the spatially dependent ERSs, a set of spatially dependent sDLUTs is determined by finding a set of transformations between local and target color in the intersection gamut. Since the local printer models span several pixel columns, there are different options to sDLUT applications. The local sDLUT may either be applied to all the pixels within the region it spans, or interpolation between neighboring sDLUTs may be used for pixels in between the central pixels of the regions.

Assuming that L*a*b* spatial profiles are available when performing the described steps, the steps are described with reference to CMYK colorants, however, other colorants known in the art may be used. Examples of other colorants commonly used in color printing are light cyan, light magenta, light black (gray), dark yellow, orange, violet, red, green, and blue. While cyan, magenta, yellow and black are considered a conventional colorant set, we may refer to colorant sets with additional colorants as alternative colorant sets.

While the above modules are described with reference to multiple ERSs arising from a set of spatial positions, the multiple ERSs may arise instead from sources such as multiple print devices 140 in, e.g., a cluster printing environment, which generally refers to the use of multiple print devices 140 for a given print job and can include specific multiple print engine architectures such as tightly integrated parallel printing and tightly integrated serial printing. Further, the multiple ERSs may arise from a combination of sources such as multiple print devices 140 and spatial positions for one or more of the print devices 140

In some embodiments, print device 140, either computes streak compensation targets or retrieves patch patterns from the color queue 186 and prints suitable calibration patterns on output media or on the photoreceptor. The print device 140 may comprise or be in communication with a photoreceptor or media sensor that detects and measures the color value (e.g. Lab, XYZ, RGB, etc.) profiles as input to the communication module 213 as previously described. The gamut mapping platform 197, utilizing the above-described processing modules performs the spatial uniformity correction calculations as previously described outputs the calculated sDLUTs. The sDLUTs are stored in the color storage module 167 and communicated to the print device 140 as needed, or may optionally be stored locally in the color queue 186 for use by the print device 140.

Consequently, as a result of the above-described processes, the print device can make use of the sDLUTs when processing documents having images which are inputted for printing or imaging spatial uniformity corrected output documents or images. The print device 140, as previously described, compensates for printer non-uniformity by sending each image or document pixel, or groups of pixels, to the appropriate sDLUT or sDLUTs (for the cases where spatial interpolation between nodes is needed). The selected sDLUT or sDLUTs are then utilized to determine the color corresponding to the mapped pixel or group of pixels, e.g., CMYK, to be sent to the printer's imaging system, thereby producing the spatial uniformity corrected output documents or images. Further, the input documents may be inputted by a user to the print device 140 by means of a network connection or from a storage device operatively connected to the print device 140

Figure 3:
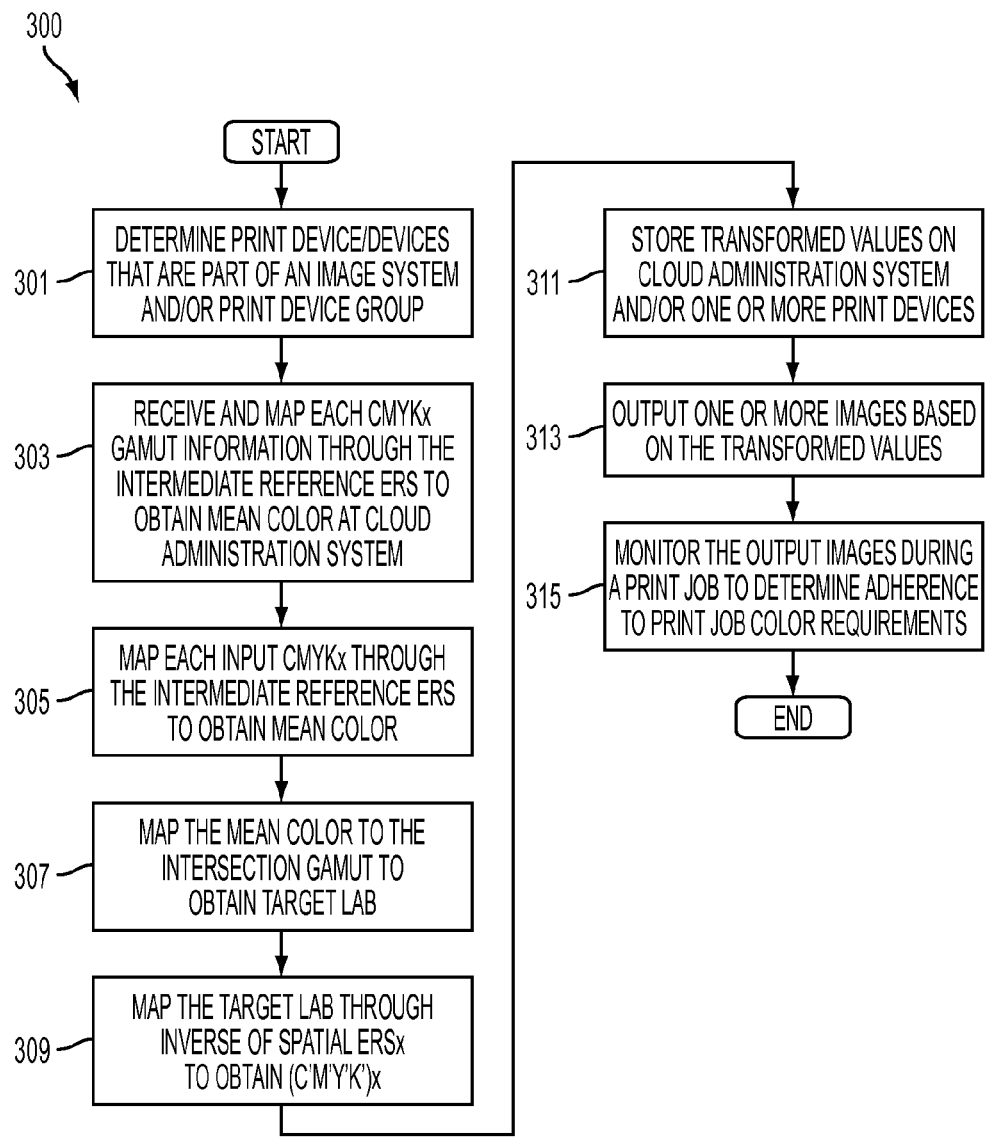
FIG. 3 is a flowchart of a process for managing common color profiles for one or more print devices by a cloud administration system, according to one embodiment.
Figure 5:
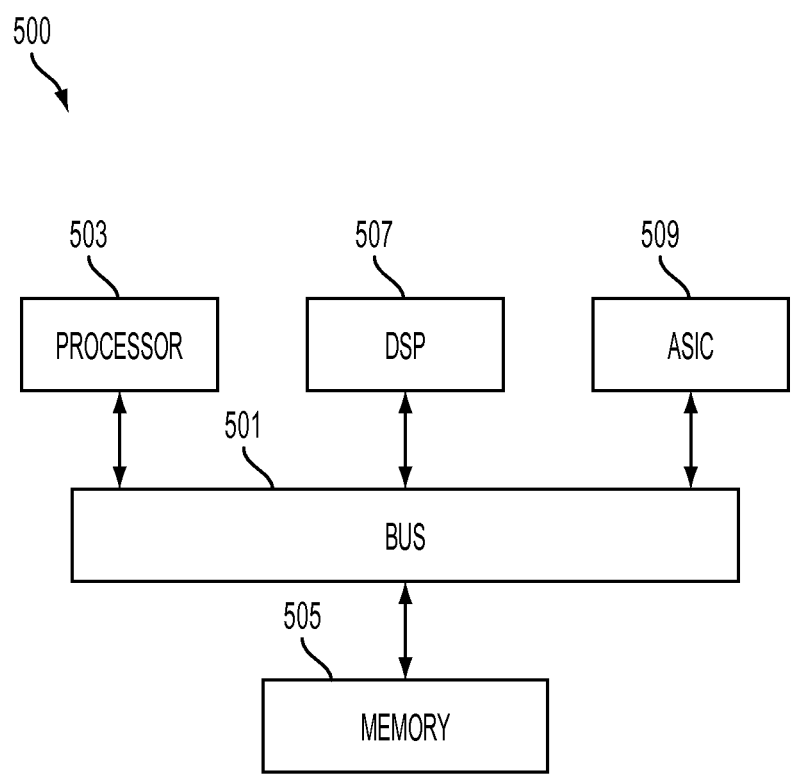
FIG. 5 is a diagram of a chip set that can be used to implement an embodiment.

FIG. 3 is a flowchart of a process for managing common color profiles for one or more printing devices by a cloud administration system, according to one embodiment. In one embodiment, the gamut mapping platform 197 performs the process 300 and is implemented in, for instance, a chip set including a processor and a memory as shown in FIG. 5, or the processor 110, discussed above. In step 301, the gamut mapping platform 197 determines what print devices are to have their color uniformity managed as being part of an imaging system or a group of print devices. In this embodiment, the imaging system may comprise any number of print devices, or groups of print devices, in any location, for example, and may be designated as such by a system administrator or end user, for example. Then, in step 303, based on received achievable gamut information provided by each of the print devices that are part of the imaging system or group of print devices, the gamut mapping platform 197 maps the set of transformations between the local and target color (set of sDLUTs) by calculating the final sDLUTs as a composite transformation from $(CMYK)_x \rightarrow (C'Y'M'K')_x$. Then, in step 305, each input $CMYK_x$ is mapped through the intermediate reference ERS to obtain the mean Lab color (Lab). Next, in step 307, the mean color is then mapped to the intersection gamut to obtain the respective target Lab color ($Lab_{target}$). Then, in step 309, $Lab_{target}$ is mapped through the inverse of spatial $ERS_x$ to obtain $(C'Y'M'K')_x$. Any inversion technique known in the art, e.g. tetrahedral or distance-weighted regression, can be used. If the spatial $ERS_x$ is an N-to-3 transform, where N>3 (e.g., $CMYK_x$ to $LAB_x$) then the inverse will not be unique. In this case suitable constraints can be applied, e.g., selecting the $(C'Y'M'K')_x$ that is closest to the input $CMYK_x$ in 4-D colorant space.

An image can be compensated for printer non-uniformity by mapping each pixel CMYKx though the sDLUTs to obtain the (C'Y'M'K'), which is sent to the print device 140.

The process continues to step 311 in which the gamut mapping platform 197 causes, at least in part, the transformed values (i.e. the inverted values discussed above) to be store in one or more of a color storage module at the cloud administration system and a color queue at one or more print devices. Then, in step 313, the imaging system or print device 140 are caused to output one or more images based on the transformed values. The transformed values are communicated to the print devices to cause a uniform printing of one or more images. The cloud administration system 100 monitors the output images in step 315 to assure adherence to the print job requirements. If a threshold level is broken, the cloud administration system 100 may cause the print job to stop, or continue, depending on certain print job variables such as whether the print job is color sensitive, or how many sheets are left until completion of the print job.

Figure 4:
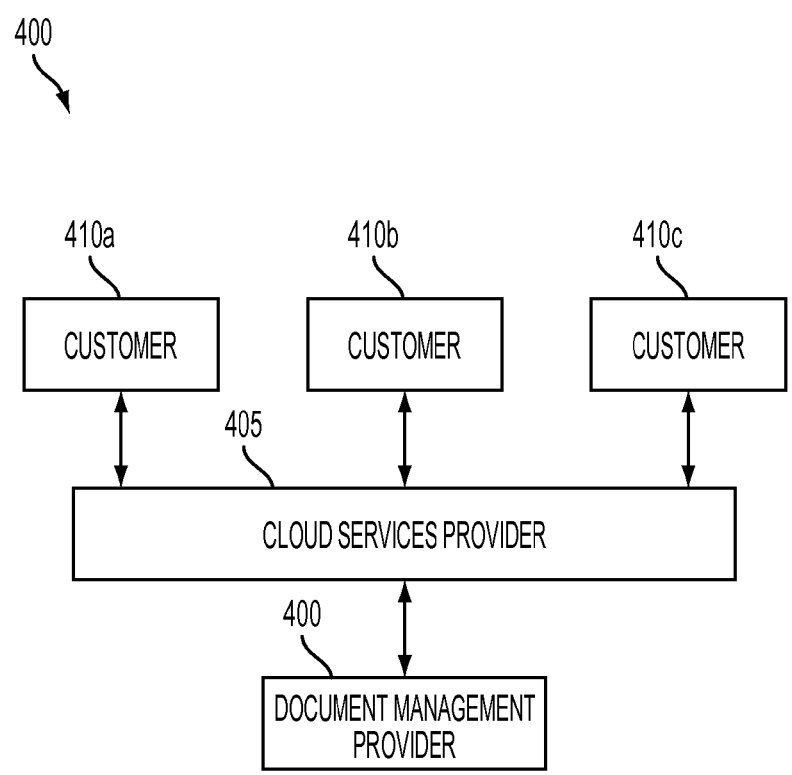
FIG. 4 is a diagram of a cloud administration system, according to one embodiment.

FIG. 4 illustrates an exemplary implementation of a cloud administration system according to an embodiment. A document management provider 400 may contract with a cloud services provider 405 to provide cloud services to the document management provider's customers 410*a*-N. A document management provider 400 may be an entity that supplies, manages and/or maintains print devices, processes print jobs and/or performs other document management services. A cloud services provider 405 may operate and/or maintain a cloud administration system to provide cloud services. Cloud services may include applications that are accessed remotely on demand from a cloud services provider that hosts the applications. Cloud services may include applications for document management, document processing, account management, print device configuration, document retention and backup, inventory management and/or the like.

In an embodiment, a computing device operated by a customer 410*a*-N may communicate directly with a cloud administration system. For example, a print device utilized by a customer 410*a*-N at the customer's location may provide achievable gamut information to a cloud administration system operated by a cloud services provider 405. The cloud administration system may store the achievable gamut information and process the achievable gamut information along with achievable gamut information provided from other print devices to determine a common achievable gamut. In an embodiment, an application computing device operated by the document management provider 400 or another entity with whom the document management provider has contracted, may access achievable gamut information from the cloud administration system.

For example, a cloud administration system may store achievable gamut information associated with print devices operated by a customer 410a-N. The document management provider 400 may access the achievable gamut information via an application computing device from the cloud administration system in order to monitor and track a customer's 410a-N compliance with requirements of a particular print job (i.e. whether the customer is printing within a range of an allowed variance during a color sensitive print job as discussed above).

The processes described herein for managing common color profiles for one or more printing devices by a cloud administration system may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 5 illustrates a chip set or chip 500 upon which an embodiment may be implemented. Chip set 500 is programmed to manage common color profiles for one or more printing devices by a cloud administration system as described herein may include, for example, bus 501, processor 503, memory 505, DSP 507 and ASIC 509 components.

The processor 503 and memory 505 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of managing common color profiles for one or more printing devices by a cloud administration system.

In one or more embodiments, the chip set or chip 500 includes a communication mechanism such as bus 501 for passing information among the components of the chip set 500. Processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 503 performs a set of operations on information as specified by computer program code related to manage common color profiles for one or more printing devices by a cloud administration system. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 501 and placing information on the bus 501. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 503, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 503 and accompanying components have connectivity to the memory 505 via the bus 501. The memory 505 may include one or more of dynamic memory (e.g., RAM, magnetic disk, writable optical disk, etc.) and static memory (e.g., ROM, CD-ROM, etc.) for storing executable instructions that when executed perform the inventive steps described herein to managing common color profiles for one or more printing devices by a cloud administration system. The memory 505 also stores the data associated with or generated by the execution of the inventive steps.

In one or more embodiments, the memory 505, such as a random access memory (RAM) or any other dynamic storage device, stores information including processor instructions for managing common color profiles for one or more printing devices by a cloud administration system. Dynamic memory allows information stored therein to be changed by system 100. RAM allows a unit of information stored at a location called a memory address to be stored and retrieved independently of information at neighboring addresses. The memory 505 is also used by the processor 503 to store temporary values during execution of processor instructions. The memory 505 may also be a read only memory (ROM) or any other static storage device coupled to the bus 501 for storing static information, including instructions, that is not changed by the system 100. Some memory is composed of volatile storage that loses the information stored thereon when power is lost. The memory 505 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 503, including instructions for execution.

Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the invention is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method for cloud administrative management of spatial uniformity correction useful in printing, the method comprising:
    determining, by a cloud administration system, an achievable gamut achievable by an imaging system for at least one of: all spatial locations of an output image, all print engines of a plurality of print engines, and at least one printer within a cluster of printers, wherein the cloud administration system is a remote resource from at least one of the plurality of print engines and the cluster of printers;
    determining, by the cloud administration system, a mean gamut, wherein the mean gamut is any gamut containing the achievable gamut;
    causing, at least in part, a gamut mapping from the mean gamut to the achievable gamut;
    determining a set of transformations for each of a set of input colors to a set of target colors, the set of target colors selected from colors in the achievable gamut;
    causing, at least in part, for a received digital image, a transformation of values of at least one of each received image pixel and clusters of received image pixels to transformed values based, at least in part, on the determined set of transformations;
    causing, at least in part, an output image to be generated based, at least in part, on the transformed values by communicating the transformed values from the cloud administration system to the imaging system;
    determining an allowable variance value between the determined transformed values and an output performance value of at least one of all the print engines of the plurality of print engines, and at least one printer of the cluster of printers based, at least in part, on the output image;
    determining the output performance value;
    determining the output performance value falls outside a threshold range associated with the determined transformed values;
    causing, at least in part, an error message to be displayed; and
    determining to cause additional output images to be generated or prohibit generation of additional output images.

2. A method of claim 1, wherein the mean gamut comprises a gamut based on a spatially averaged gamut of the imaging system, and the achievable gamut comprises an intersection gamut.

3. A method of claim 2, further comprising:
    determining a plurality of spatially dependent engine response sets, each of the plurality of spatially dependent engine response sets corresponding to a position of the output image, and the spatially dependent engine response sets representing an imaging system model based on a plurality of measured responses to calibration targets;
    determining a mean engine response set based on the plurality of spatially dependent engine response sets, wherein the mean gamut is based on the mean engine response set; and
    determining a plurality of spatially dependent gamuts associated with the plurality of spatially dependent engine response sets, wherein the plurality of spatially dependent gamuts are used for determining the achievable gamut.

4. A method of claim 3, the determining a set of transformations comprising:
    causing, at least in part, a mapping of each of a plurality of input colors to its corresponding mean color in the mean engine response set;
    causing, at least in part, a mapping of the mean color to a color in the achievable gamut to obtain a mean target color based on the gamut mapping; and
    causing, at least in part, a mapping of the mean target color through the inverse of the mean spatial engine response set to determine the colorant combination that produces the mean target color.

5. A method of claim 4, wherein the determining a set of transformations further comprises:
    causing, at least in part, a set of sDLUTs to be calculated, wherein the step of transforming values of at least one of each received image pixel and clusters of received image pixels is based, at least in part, on the set of sDLUTs.

6. A method of claim 5, further comprising:
    causing, at least in part, the set of sDLUTs to be stored by one or more of the cloud administration system, at least one print engine of the plurality of print engines, and at least one printer of the cluster of printers.

7. The method of claim 3, wherein the imaging system is a color printing system utilizing at least one of CMYK color sets, and alternative color sets.

8. A method of claim 3, wherein the engine response sets comprise CMY→L*a*b* and K→L* mappings.

9. A method of claim 3, wherein the engine response sets comprise CMYK→L*a*b* mappings.

10. An apparatus for cloud administrative management of spatial uniformity correction useful in printing comprising:
    at least one processor; and
    at least one memory including computer program code for one or more programs, the at least one memory and the computer program code configured to, with the at least one processor, cause the apparatus to perform at least the following, determine, at a cloud administration system, an achievable gamut achievable by an imaging system for at least one of: all spatial locations of an output image, all print engines of a plurality of print engines, and at least one printer within a cluster of printers, wherein the cloud administration system is a remote resource from at least one of the plurality of print engines and the cluster of printers;

determine, at the cloud administration system, a mean gamut, wherein the mean gamut is any gamut containing the achievable gamut;

cause, at least in part, a gamut mapping from the mean gamut to the achievable gamut;

determine a set of transformations for each of a set of input colors to a set of target colors, the set of target colors selected from colors in the achievable gamut;

cause, at least in part, for a received digital image, a transformation of values of at least one of each received image pixel and clusters of received image pixels to transformed values based, at least in part, on the determined set of transformations;

cause, at least in part, an output image to be generated based, at least in part, on the transformed values by communicating the transformed values from the cloud administration system to the imaging system;

determine an allowable variance value between the determined transformed values and an output performance value of at least one of all the print engines of the plurality of print engines, and at least one printer of the cluster of printers based, at least in part, on the output image;

determine the output performance value;

determine the output performance value falls outside a threshold range associated with the determined transformed values;

cause, at least in part, an error message to be displayed; and determine to cause additional output images to be generated or prohibit generation of additional output images.

11. An apparatus of claim 10, wherein the mean gamut comprises a gamut based on a spatially averaged gamut of the imaging system, and the achievable gamut comprises an intersection gamut.

12. An apparatus of claim 11, further comprising:

determine a plurality of spatially dependent engine response sets, each of the plurality of spatially dependent engine response sets corresponding to a position of the output image, and the spatially dependent engine response sets representing an imaging system model based on a plurality of measured responses to calibration targets;

determine a mean engine response set based on the plurality of spatially dependent engine response sets, wherein the mean gamut is based on the mean engine response set; and determine a plurality of spatially dependent gamuts associated with the plurality of spatially dependent engine response sets, wherein the plurality of spatially dependent gamuts are used for determining the achievable gamut.

13. An apparatus of claim 12, the determining a set of transformations comprising:

cause, at least in part, a mapping of each of a plurality of input colors to its corresponding mean color in the mean engine response set;

cause, at least in part, a mapping of the mean color to a color in the achievable gamut to obtain a mean target color based on the gamut mapping; and cause, at least in part, a mapping of the mean target color through the inverse of the mean spatial engine response set to determine the colorant combination that produces the mean target color.

14. An apparatus of claim 13, wherein the determining a set of transformations further comprises:

cause, at least in part, a set of sDLUTs to be calculated, wherein the step of transforming values of at least one of each received image pixel and clusters of received image pixels is based, at least in part, on the set of sDLUTs.

15. An apparatus of claim 14, further comprising:

cause, at least in part, the set of sDLUTs to be stored by one or more of the cloud administration system, at least one print engine of the plurality of print engines, and at least one printer of the cluster of printers.

16. An apparatus of claim 12, wherein the imaging system is a color printing system utilizing at least one of CMYK color sets, and alternative color sets.

17. An apparatus of claim 12, wherein the engine response sets comprise CMY→L*a*b* and K→L* mappings.

18. An apparatus of claim 12, wherein the engine response sets comprise CMYK→L*a*b* mappings.

* * * * *